United States Patent
Greene

(10) Patent No.: US 6,778,530 B1
(45) Date of Patent: Aug. 17, 2004

(54) METHOD AND APPARATUS FOR MULTIPLE FIELD MATCHING IN NETWORK DEVICE

(75) Inventor: Spencer Greene, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 09/436,439

(22) Filed: Nov. 8, 1999

(51) Int. Cl.[7] .............................................. H04L 12/56
(52) U.S. Cl. ...................................................... 370/389
(58) Field of Search ................................ 370/389, 392, 370/401, 411, 412, 428, 429; 709/245

(56) References Cited

U.S. PATENT DOCUMENTS

| | | | | |
|---|---|---|---|---|
| 6,011,795 A | * | 1/2000 | Varghese et al. | 370/392 |
| 6,137,707 A | * | 10/2000 | Srinivasan et al. | 365/49 |
| 6,341,130 B1 | * | 1/2002 | Lakshman et al. | 370/389 |
| 6,449,256 B1 | * | 9/2002 | Varghese et al. | 370/238 |
| 6,467,019 B1 | * | 10/2002 | Washburn | 711/108 |
| 6,631,419 B1 | * | 10/2003 | Greene | 709/238 |

OTHER PUBLICATIONS

Copy of U.S. Ser. No. 09/401,475, filed on Sep. 22, 1999; Spencer Greene; Method and Apparatus for High–Speed Longest Prefix and Masked Prefix Table Search; 86 pages.

* cited by examiner

Primary Examiner—Chi Pham
Assistant Examiner—Derrick W Ferris
(74) Attorney, Agent, or Firm—Harrity & Snyder LLP

(57) ABSTRACT

A system for providing multiple field matching capabilities for network data packets is disclosed. According to one embodiment (700) the system includes a number of prefix engines (704-0, 704-1, 712-0 and 712-1) coupled together in a pipelined fashion. First level prefix engines (704-0 and 704-1) perform longest prefix matching operations on address values (Dest-IP and Src-IP) and provide address equivalence class values (daclass and saclass). The address class equivalence values (daclass and saclass) are combined with port identification values (Dest-Port and Src-Port) and applied to second level prefix engines (712-0 and 712-1) which provide tuple equivalence class values (dtclass and stclass). The tuple equivalence class values (dtclass and stclass) are combined and applied to an output mapping circuit (718) which provides a flow specification value corresponding to each applied set of address (Dest-IP and Src-IP) and port (Dest-Port and Src-Port) values.

17 Claims, 6 Drawing Sheets

| DEST_IP | DEST_PORT | SRC_IP | SRC_PORT | TCP/UDP |
|---|---|---|---|---|
| 32 bits | 16 bits | 32 bits | 16 bits | 1 bit |

FIG. 1

| RULE | DESTINATION PREFIX | DESTINATION PORT | SOURCE PREFIX | SOURCE PORT | OUTPUT |
|---|---|---|---|---|---|
| 1.1 | 192.9/16 | HTTP | /0 | ANY | flowspec=A |
| 1.2 | 192.9/16 | ANY | 192/8 | ANY | flowspec=B |

FIG. 2

| RULE | DESTINATION PREFIX | DESTINATION PORT | SOURCE PREFIX | SOURCE PORT | OUTPUT |
|---|---|---|---|---|---|
| 2.1 | 192.9/16 | HTTP | /0 | ANY | flowspec=A |
| 2.2 | 192.9/16 | not (HTTP) | 192/8 | ANY | flowspec=B |

FIG. 3A

| RULE | DESTINATION PREFIX | DESTINATION PORT | SOURCE PREFIX | SOURCE PORT | OUTPUT |
|---|---|---|---|---|---|
| 3.1 | 192.9/16 | HTTP | 0/1 | ANY | flowspec=A |
| 3.2 | 192.9/16 | HTTP | 128/2 | ANY | flowspec=A |
| 3.3 | 192.9/16 | HTTP | 193/8 | ANY | flowspec=A |
| 3.4 | 192.9/16 | HTTP | 194/7 | ANY | flowspec=A |
| 3.5 | 192.9/16 | HTTP | 196/6 | ANY | flowspec=A |
| 3.6 | 192.9/16 | HTTP | 200/5 | ANY | flowspec=A |
| 3.7 | 192.9/16 | HTTP | 208/4 | ANY | flowspec=A |
| 3.8 | 192.9/16 | HTTP | 224/3 | ANY | flowspec=A |
| 3.9 | 192.9/16 | ANY | 192/8 | ANY | flowspec=B |

FIG. 3B

| RULE | DESTINATION PREFIX | DESTINATION PORT | SOURCE PREFIX | SOURCE PORT | OUTPUT |
|---|---|---|---|---|---|
| 4.1 | 192.9/16 | | | | daclass=da01 |
| 4.2 | | | /0 | | saclass=sa00 |
| 4.3 | | | 192/8 | | saclass=sa01 |
| 4.4 | da01 | HTTP | sa00 | ANY | flowspec=A |
| 4.5 | da01 | HTTP | sa01 | ANY | flowspec=A |
| 4.6 | da01 | not (HTTP) | sa01 | ANY | flowspec=B |

FIG. 4A

| RULE | DESTINATION PREFIX | DESTINATION PORT | SOURCE PREFIX | SOURCE PORT | OUTPUT |
|---|---|---|---|---|---|
| 4B.1 | 192.9/16 | | | | daclass=da01 |
| 4B.2 | | | /0 | | saclass=sa00 |
| 4B.3 | | | 192/8 | | saclass=sa01 |
| 4B.4 | da01 | HTTP | sa00 | ANY | flowspec=A |
| 4B.5 | da01 | ANY | sa01 | ANY | flowspec=B |

FIG. 4B

| RULE | PREFIX | OUTPUT |
|---|---|---|
| 5.1 | (da01, ANY)/15 | dt02 |
| 5.2 | (da01, HTTP)/32 | dt01 |

| RULE | PREFIX | OUTPUT |
|---|---|---|
| 5.3 | (sa00, ANY)/15 | st00 |
| 5.4 | (sa01, ANY)/15 | st01 |

FIG. 5

| RULE | ADDRESS[15:8] | ADDRESS[7:0] | OUTPUT |
|---|---|---|---|
| 6.1 | dt01 | st00 | flowspec=A |
| 6.2 | dt01 | st01 | flowspec=A |
| 6.3 | dt02 | st01 | flowspec=B |

FIG. 6A

| RULE | ADDRESS[15:8] | ADDRESS[7:0] | OUTPUT |
|---|---|---|---|
| 6B.1 | dt01 | st00 | flowspec=A |
| 6B.2 | dt01 | st01 | flowspec=B |
| 6B.3 | dt02 | st01 | flowspec=B |

FIG. 6B

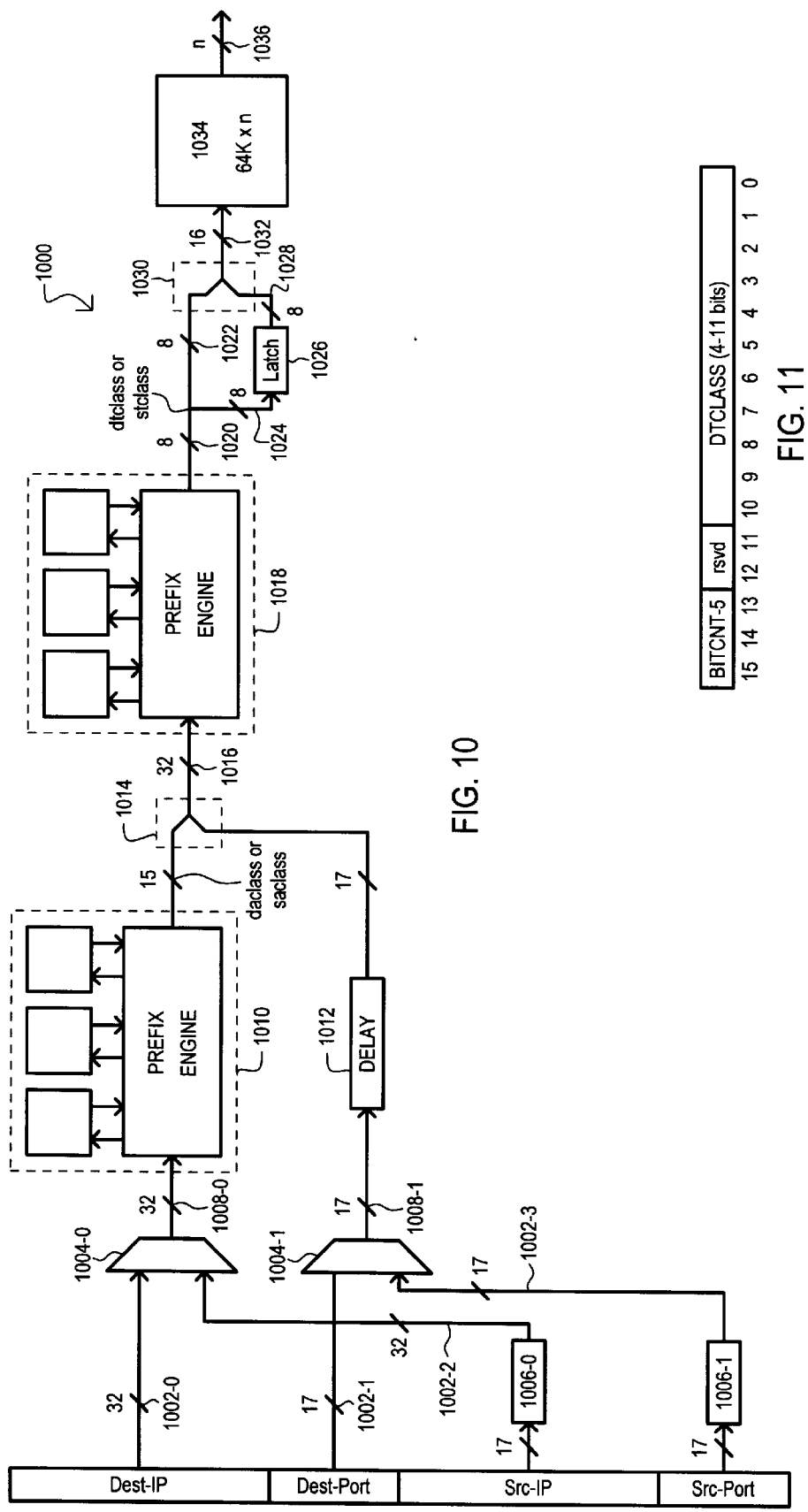

METHOD AND APPARATUS FOR MULTIPLE FIELD MATCHING IN NETWORK DEVICE

TECHNICAL FIELD

The present invention relates generally to data communications, and more particularly to systems and methods for processing network data according to rules requiring multiple field matches.

BACKGROUND OF THE INVENTION

With the explosion in growth of data communication networks, a need has arisen for faster table lookup operations for handling the transmission of network data. Within a network structure, data is typically transferred between a source station and a destination station in the form of a packet. A network device, such as bridge or router or similar system, will receive a data packet and forward it on toward its final destination. The forwarding operation of such network devices involves a basic forwarding lookup operation that is performed within the device. In a forwarding lookup operation, the initial portion ("header") of a packet is examined, and using a particular destination address field within the header, a table of known destinations is searched. The result of that search allows the packet to forwarded to an output port, and onward toward its destination. The operation is referred to as a "basic" forwarding lookup operation, as it involves a lookup on only one field (destination address) from the packet header.

Within a high speed network device, this lookup function may be performed by a portion of the device referred to as a lookup engine. A basic lookup engine manages forwarding (routing) table that can include a potentially large number of rules. Each rule tells the router how to process a certain class of packet, those packets whose headers match the rule. The routing table thus includes a number of database entries that are indexed by header field information. Such a lookup engine receives a data field extracted from a packet, and uses the data field to retrieve routing instructions from the routing table.

The use of the term "basic" to describe single field lookup operations is not intended to imply that such operations are easily accomplished. Some types of single field lookup operations can require sophisticated lookup operations. In particular, many types of network protocols can require "longest prefix matching" lookup operations. Such operations include rules that provide different routing instructions according to variable length portions (prefixes) within a given data field. As just one example, two routing rules are set forth below.

192.9/16→Nexthop "A"

192.9.4/24→Nexthop "B."

The addresses are written by separating "octets" (8-bit sections) by periods. Thus, the address 192.9.0.0 is equal to binary 11000000 00001001 00000000 00000000. The first rule requires that the first 16-bits of the 32-bit address be examined, and if they are equal to 192.9 (11000000 00001001), the packet will be forwarded to a location identified as nexthop A. The second rule requires that the first 24-bits of the address be examined. If the first 24-bits is equal to 192.9.4 (11000000 00001001 00000100), the packet will be forwarded to a location nexthop B.

It is noted that the two described rules "overlap." That is, an address of 192.9.4.X (where X is a binary octet of any value) will match both rules. Such rule overlap situations are typically resolved by giving the longest prefix precedence. Thus, the example address 192.9.4.X would be forwarded to nexthop B according to longest prefix matching.

The lookup operation on a prefix may be accomplished with a prefix matching engine. Such engines may be formed within an integrated circuit, or be implemented as an algorithm executed by a general purpose or special purpose programmable processor. A novel prefix matching engine is set forth in commonly owned, co-pending U.S. patent application Ser. No. 09/401,475 entitled "METHOD AND APPARATUS FOR HIGH SPEED LONGEST PREFIX AND MASKED PREFIX TABLE SEARCHES" by the present inventor. This application will be referred to hereinafter as "LONGEST PREFIX MATCHING METHOD AND APPARATUS." The contents of this application are incorporated by reference herein.

While the longest prefix matching problem raises considerable challenges in the implementation of network devices, there is an increasing need to address even more complex functions. One such function is "multiple field matching." Multiple field matching looks "deeper" into packet information in order to determine routing information. For example, many networking systems can include features that extend beyond a simple forwarding function. Such features include access control lists, policy-based routing, flow classification, traffic accounting, quality of service (QOS), and class of service (COS). As a result, rather than forward data packets to the same location based on destination information alone, such systems must discriminate among packets going to the same destination based on various additional criteria within the packet header.

As just one example, flow classification rules may include fields that specify an IP destination address range, a destination port range, an IP source address range, a source port range, and a protocol. A number of such rules make up a classification table. For each incoming packet, the classification table is searched to determine which rule, if any, applies to the packet; a rule is said to apply to a packet only if the packet's header values in all five fields (destination address, destination port, source address, source port, and protocol) satisfy the corresponding ranges specified in the rule. When more than one rule applies to a packet, then a relative priority among rules determines which one is returned from the table search process. Because there can be thousands of such rules, the standard approach for multiple field classification table searching, which is to scan sequentially through the rules in the table testing the packet header against each rule, can take considerable time to execute.

An example of a particular multiple field key is shown in FIG. 1.

Due to the complexity involved in multiple field matching, such processing can present a considerable bottleneck in a network system. To accomplish multiple field matching at high speed is generally regarded as more difficult than longest prefix matching at comparable speed.

It would be desirable to provide a system that can accomplish multiple field matching operations, but not require costly, or overly complex memory devices to implement.

It would also be desirable to provide a multiple field matching system that is relatively compact when implemented in hardware.

SUMMARY OF THE INVENTION

According to disclosed embodiments, a system provides multiple-field matching capabilities for table searching. The matching is based on multiple key fields where each rule has a specification (such as a range or prefix) or a wild card in each field. A rule match occurs when all fields of the search satisfy the corresponding fields of the rule. The system includes a number of single field lookup engines that are connected together in a pipelined fashion. In one embodiment, the pipelined arrangement allows the system to provide one multiple field lookup result per memory clock cycle. In another embodiment, a smaller number of lookup engines can be employed to provide one multiple field lookup result for every two memory clock cycles.

According to one aspect of the embodiments, a first field lookup can compress ranges of input key field values into "equivalence class" values. Equivalence class values can then be combined with other fields and/or equivalence class values to generate an index value to associated data.

According to another aspect of the embodiments, a lookup operation can compress ranges of more than one field into equivalence class values.

According to one aspect of a preferred embodiment, a system provides multiple field lookups that include longest prefix matching, and an arbitrary number of additional fields.

According to another aspect of a preferred embodiment, a system includes a memory system for storing a classification rule data structure, and performs multiple field lookups in a pipelined fashion. Consequently, one resulting lookup output value can be provided for every one memory cycle.

According to another aspect of a preferred embodiment, a system includes a compact classification rule data structure, and so requires a relatively small amount of memory to implement.

BRIEF DESCRIPTION OF THE DRAWINGS

FIG. 1 is a diagram illustrating fields for a particular multiple field match operation.

FIG. 2 is an example of two overlapping classification rules.

FIGS. 3A and 3B are tables illustrating two possible non-overlapping sets of classification rules corresponding to the classification rules set forth in FIG. 2.

FIGS. 4A and 4B are tables illustrating single field "equivalence classes" corresponding to the non-overlapping classification rule sets of FIGS. 3A and 3B.

FIG. 5 is a table illustrating tuple "equivalence classes" corresponding to the non-overlapping classification rule sets of FIGS. 3A and 3B.

FIGS. 6A and 6B are tables illustrating how tuple equivalence classes can be combined to accomplish the same results as the non-overlapping classification rule sets of FIGS. 3A and 3B.

FIG. 10 is a block schematic diagram illustrating a fourth embodiment architecture.

FIG. 11 is a table illustrating a possible data output value for unevenly partitioning a combination dsclass/ssclass value.

DETAILED DESCRIPTION OF THE EMBODIMENTS

Figure 7:
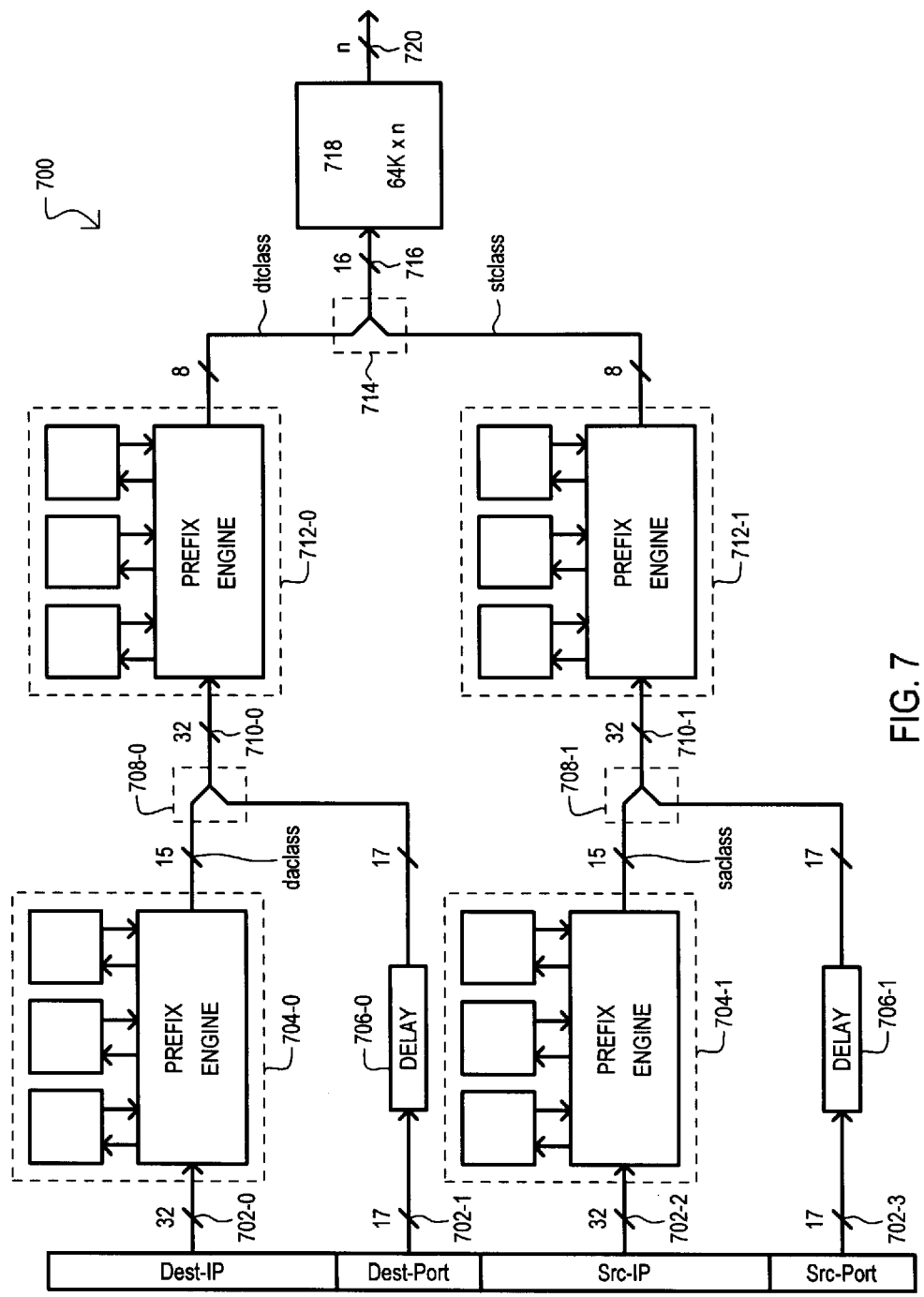
FIG. 7 is a block schematic diagram illustrating a first embodiment architecture.

The present invention will be described as a series of embodiments in conjunction with various tables and figures. The various embodiments illustrate systems for providing high throughput multiple field matching for complex table searches. Rapid multiple field matching is accomplished by daisy-chaining a series of single-field lookup engines in a pipelined fashion.

According to one embodiment, a system can receive input keys having multiple field values and provide corresponding output values according to search table criteria. Search table criteria can correspond to multiple field rules having associated output data values. Each field in a rule can be a value or a range of values. If the multiple fields of an input value match corresponding fields in a rule, the associated output value is provided.

In operation, the system can receive multiple key fields in parallel. Selected key fields may be "compressed" by a prefix match operation into equivalence class values. An equivalence class value can be a set of values for a field such that, for any rule that specifies one member of the equivalence class, there is a corresponding rule for each other member of the equivalence class with the same values in the other fields. In other words, if we have precomputed that the destination-address values $\{xda_1, xda_2, xda_3, \ldots, xda_n\}$ form an equivalence class X, then if search i presents destination-address $xda_i \subset X$ in the destination-address field, we can construct a search j which substitutes $xda_j \subset X$ in the destination-address field, leaving other fields unchanged, and the output result of search j is guaranteed (by the properties of equivalence class X) to be the same as the output result of search i.

Input field values can be compressed into corresponding equivalence class values in parallel and/or a pipelined fashion. Equivalence class values may then be combined to index to the appropriate output value. This is in contrast to conventional approaches that may search each field separately, and seek to maintain a "hit" list of each field of a rule, and generate an output value when all fields indicate a hit.

A system according the present invention can also compress multiple key fields into an equivalence class value for the multiple fields (referred to herein as a tuple). Tuples can be combined with other fields and/or tuples to generate an index to a multiple match result.

Non-Overlapping Rules and Equivalence Classes

The data structure utilized by the preferred embodiment may be best understood by example. The example described assigns particular values to key fields that may be suitable for the particular application of TCP/IP flow classification. While this can be a particularly useful and advantageous application of the invention, it is understood that the invention can be used for other table search applications that take similar form.

The example is intended to illustrate the concept of "non-overlapping" rules, and how equivalence classes can be derived from non-overlapping rules. A two-rule example is set forth in FIG. 2. FIG. 2 includes a first rule, labeled 1.1 and a second rule labeled 1.2. Each rule includes an output value (shown in column OUTPUT) and specifications for four key fields (Destination Prefix, Destination Port, Source Prefix and Source Port). These rules may specify, for example, how packets may be processed according to various fields in the packet headers.

It is noted that particular search keys may match both rules of FIG. 2. For example, if a search key has a first field (Destination Address) value with a 16-bit prefix of 192.9, a second field (Destination Port) value of HTTP (protocol= TCP, port=80), and a third field (Source Address) value with an 8-bit prefix of 192, the requirements of both rules can be met. It would not be clear whether output value A or output value B should be output from the search. The rule set of FIG. 2 can thus be considered to represent a case of "overlapping rules." This is in contrast to the data structure employed by the preferred embodiment, which relies on first establishing "non-overlapping" rule sets.

Referring back to FIG. 2, a non-overlapping set of rules can be established by designating one of the overlapping rules as taking precedence over the other. Thus, if it is assumed that rule 1.1 takes precedence over rule 1.2, the resulting non-overlapping case is shown in FIG. 3A. Non-overlapping rules are established by essentially keeping rule 1.1 (as rule 2.1), and changing the second rule, so that it only applies to destination port values that are "not HTTP."

In contrast, if rule 1.2 takes precedence over rule 1.1, a different set of overlap-resolution rules will result. This different set of rules is shown in FIG. 3B. Rules 3.1 to 3.8, collectively, represent the case of where rule 1.1 applies to all source prefixes that are "not 192/8" (i.e., do not have an initial 8-bits equal to 11000000). It is noted that the resulting rule set of FIG. 3B illustrates that the resolution of rule overlaps may result in an increased number of rules in the non-overlapping rule set.

Once a set of non-overlapping rules is established, the preferred embodiment data structure relies on "equivalence classes." An equivalence class will represent match criteria for a given field examined by itself, in relation to all rules in the table.

First, an example of a database corresponding to FIG. 3A will be described. An example of a database corresponding to FIG. 3B will then be described.

The equivalence classes for the non-overlapping rule set of FIG. 3A are as follows. If the first field (Destination Address) match criteria are examined first, it is shown that if the other match fields (Destination Port, Source Prefix, Source Port) are ignored, the match criteria "192.9/16" does not, by itself, distinguish between the two rules. That is, the either output value (A or B) can apply when the first field matches the criterion 192.9/16. Thus, for the particular rule set of FIG. 3A, there is only one first field equivalence class. We call this equivalence class "da01." There is one additional, default equivalence class for the first field, which we will call "da00," representing everything that is "not da01." In general, for each field there is a default equivalence class which contains all possible field values not included in any other equivalence class.

The third field (Source Address) criteria are now examined to derive third field equivalence classes. In FIG. 3A, the two different third field criteria correspond to two different equivalence classes. There is an equivalence class for third field values that match the prefix 192/8 (leading 8 bits= 11000000), which we will call "sa01," and a default equivalence class representing everything that is "not sa01" which we will call "sa00." Note that the default class sa00 which also matches the /0 don't care specification in rule 2.1.

The preferred embodiment data structure relies on retrieving an equivalence class value, at an intermediate step, when match criteria are met for an equivalence class for a particular field. The mapping of each field's specifications to its equivalence classes for the ruleset of FIG. 3A is set forth in FIG. 4A.

It is noted that equivalence class values allow the set of possible values of a field to be "compressed" according to a set of field mapping rules. The mapping from a key field value (such as 32-bit Destination Address) to its associated equivalence class value reduces the number of bits required to express the value. In our example, there are only two possible equivalence classes (da00 and da01), so the first field equivalence class value can be expressed in only 1 bit. By the definition we have stated earlier for "equivalence class," once we know whether a packet's destination-address field falls into class da00 or da01, the multiple-field table search algorithm need not retain any other information from the 32-bit destination address value, as the table search output will not vary among different values within an equivalence class.

Referring now to FIG. 4A, when the first field of a search key meets the class criterion "192.9/16," a first field equivalence class (daclass) value of "da01" applies. When this criterion is not met, daclass value "da00" applies. Similarly, a third field equivalence class (saclass) value of "sa00" or "sa01" will apply when the criterion for each third field equivalence class is met. It is noted that in the particular preferred data structure, the first and third field equivalence class criteria follow standard longest prefix matching rules. That is, if the "192/8" criteria is met, the saclass value of "sa01" applies. For search keys having third fields that do not have a leading 8 bit value of "192," the remaining rule applies (i.e., the sa00 value is a default value). The various first field and third field equivalence class mappings are shown as rules 4.1–4.3 in FIG. 4A.

The remaining rules of FIG. 4A illustrate how the equivalence class values can be used, in combination with the second and fourth field values to accomplish the desired multiple-field rule table set forth in FIG. 3A. In particular, if a da01 value and sa00 value correspond to the first and third fields of a particular search key, for a second field value of "HTTP," the output value A will result (rule 4.4). If an applied search key corresponds to the da01 and sa01 equivalence class values, and the fourth field is HTTP, rule 4.5 will match (which also yields output=A). However, if the source port is not HTTP, rule 4.6 will match (output=B).

In this manner, first stage match results derived from a given search key (the daclass and saclass equivalence values) can be combined with other search key field values (source port and destination port), to accomplish multiple field matching functions. In the preferred embodiment, the daclass and saclass values are fifteen bit values.

The preferred data structure further combines data field values and match criteria (i.e., equivalence values) to allow for faster table searches. In the preferred embodiment, matching field criteria for a first value and second value are used to produce a third value, representative of the match criteria of the first two values. Such third values will be referred to as tuple equivalence classes.

FIG. 5 illustrates how first field equivalence class values (daclass) can be combined with second field values and mapped to a first tuple equivalence class ("dtclass"). The mapping of first field equivalence and second field values (daclass, destination port) to dtclass tuple values is set forth as a longest-prefix matching map in FIG. 5. The first rule of FIG. 5 (rule 5.1) indicates a match for both the daclass value da01 and any second field value (da01, ANY). The resulting value is the dtclass tuple value dt02. Rule 5.2 indicates a match with both the da01 value and an HTTP second field value (da01, HTTP). The resulting value is the dtclass tuple value dt01. In the preferred embodiment, the dtclass values (such as dt02 and dt01) are eight bit values.

It is noted that in the particular case where the equivalence class value da01 is a fifteen bit value and the second field value is a 17-bit value, the overall combined value that must be matched in rules of 5.1 and 5.2 is a 32-bit value. Further, if such bit lengths are used, rule 5.1 only requires a match of a 15-bit prefix of the 32-bit value (because the second field match criteria is "ANY"), rule 5.1 is written with the "/15" designation. In contrast, for such bit lengths rule 5.2 requires a match with the 15-bit daclass value and the particular 17-bit HTTP destination port value, thus rule 5.2 is written with the /32 designation, indicating a 32-bit match is required.

FIG. 5 also illustrates how third field equivalence values (saclass) can be combined with fourth field values and mapped to a second tuple equivalence classes ("stclass"). The stclass values are set forth as longest prefix matching rules in FIG. 5. The third rule of FIG. 5 (rule 5.3) indicates a match for both the third field equivalence value sa00 and any fourth field value (sa00, ANY). The resulting tuple equivalence class is the stclass value st00. Rule 5.4 indicates a match with both the sa01 value and any fourth field value (sa01, ANY). The resulting tuple equivalence class is the second tuple equivalence class stclass st01. In the preferred embodiment, the stclass values (st00 and st01) are 8-bit values.

In a similar fashion to the rule 5.1, because the sa00 and sa01 values, in one particular example, are fifteen bit values, and the fourth field values are "ANY," both rules 5.3 and 5.4 only require a 15-bit match. Thus, rules 5.3 and 5.4 are written with the "/15" designation.

In this way, a tuple equivalence class (given by the dt00, dt01, dt02, st00 and st01 values) represents a multiple field match. In particular, for the case of rule 5.1, the dt tuple class number represents a variable prefix match for a first field and a fully enumerated match with a second field. For the case of rule 5.3, the st tuple class number represents a variable prefix match for a third field and a fully enumerated match with a fourth field.

The tuple equivalence classes can then be combined together to provide the multiple field matching necessary to generate the desired corresponding search output value (A or B). The required tuple equivalence classes for the first rule case of FIG. 3A (dominant with respect to output value A) is shown in FIG. 6A as a series of "mapped" values. Thus, the combination of the dt01 and st00 values results in an output A (rule 6.1). The combination of the dt01 and st01 values result in the output value A (rule 6.2). Finally, the combination of the dt02 and st01 values result in an output value B (rule 6.3).

In this way, the first and second tuple equivalence classes (each of which represents a two-field match) are combined together as a search key to retrieve an output value that represents a match of all four field values.

Having described a database corresponding to the example of FIG. 3A, a database corresponding to FIG. 3B will now be described.

The table of FIG. 4B represents the same general approach as FIG. 4A. The first and third field criteria result in the same saclass and daclass arrangement. However, because rule 1.2 dominates over rule 1.1, only two modified rules (rules 4B.4 and 4B.5) are needed to accomplish the desired rule table. In particular, if a da01 value and sa00 value correspond to the first and third fields of a search key, then for a destination port value of "HTTP," rule 4B.4 applies (output=A). In contrast, if a search key includes first and third fields that correspond to equivalence classes da01 and sa01, rule 4B.5 applies (output=B), regardless of the second field value.

The non-overlapping examples of FIGS. 3A and 3B result in the same specification equivalence classes. Accordingly, FIG. 5 represents tuple equivalence classes for the rule set of FIG. 4B.

FIG. 6B sets forth the mapping from first and second tuple equivalence classes to output value for the second rule case of FIG. 3B (flowspec B dominant). Accordingly, while rules 6B.1 and 6B.3 correspond to rules 6.1 and 6.3, rule 6B.2 differs from rule 6.2. In particular, the combination of the dt01 and st01 values result in the output value B in this case.

First Embodiment Apparatus

Having described the type of data structure utilized by embodiments of the present invention, a number of preferred embodiment apparatus architectures will now be described. Referring now to FIG. 7, a first embodiment is set forth in block schematic diagram and designated by the general reference character 700. The first embodiment 700 receives a number of data fields in parallel. In the particular arrangement of FIG. 7, the data fields include a first, second, third and fourth fields received on first, second, third and fourth field buses 702-0 to 702-3, respectively.

In the particular example of FIG. 7, the first field can include a 32-bit internet protocol (IP) destination address (Dest-IP), the second field can include a 17-bit destination port value (Dest-Port), the third field can include a 32-bit IP source address (Src-IP), and the fourth field can include a 17-bit source port value (Src-Port). In the particular arrangement of FIG. 7, the Dest-Port values include a 16-bit destination port identifier and a one bit protocol identifier and the Src-Port values include a 16-bit source port identifier and a one bit protocol identifier.

The first data field bus 702-0 is connected to a first level prefix engine 704-0. In a similar fashion, the third data field bus 704-2 is connected to another first level prefix engine 704-1. The first level prefix engines (704-0 and 704-1) perform matching operations on their respective data fields values and output equivalence class values. In particular, first level prefix engine 704-0 will perform a longest prefix matching function on a destination address to determine an equivalence class value daclass. Such an operation is set forth as rule 4.1 in FIG. 4A and rule 4B.1 in FIG. 4B. In a similar fashion, first level prefix engine 704-1 will perform a longest prefix matching function on a source address to determine an equivalence class value saclass. Such an operation is set forth in rules 4.2 and 4.3 in FIG. 4A, and in rules 4B.2 and 4B.3 in FIG. 4B.

In this way, first level prefix engines (704-0 and 704-1) can compress the range of all possible values of the first and third fields into equivalence class values.

In the first embodiment 700, the prefix engines can be the longest prefix matching engines described in "LONGEST PREFIX MATCHING METHOD AND APPARATUS." Such an approach provides advantageously high throughput longest prefix matching results. However, the first embodiment 700 should not be construed as being limited to such a longest prefix matching engine. Alternate lookup engines could be employed. When employed as the first level prefix engine 704-0, a longest prefix matching engine described in "LONGEST PREFIX MATCHING METHOD AND APPARATUS" will not provide next hop values as its outputs, but instead will provide equivalence class values such as daclass as described above. Concurrently, when employed as a first level prefix engine 704-1, a longest prefix matching engine will provide saclass values as described above.

As noted in conjunction with FIG. 5, matches between two fields can be accomplished by combining fields and having them index to a tuple equivalence class. This combining of fields is accomplished with delay circuits (706-0 and 706-1) and first level combining circuits (708-0 and 708-1). In particular, delay circuit 706-0 delays an applied destination port value so that it can be combined with the corresponding daclass value (output from first prefix engine 704-0) within the first level combining circuit 708-0. This combination operation can result, for example, in the values shown as "(da01, ANY)" and "(da01, HTTP)" in FIG. 5. In a similar fashion, delay circuit 706-1 delays an applied source port value so that it can be combined with the corresponding saclass value (output from first prefix engine 704-1) within the first level combining circuit 708-1.

In the first embodiment 700, the first level combining circuits (708-0 and 708-1) are formed by concatenating the 15-bit output bus from each first prefix engine (704-0 and 704-1) with the (delayed) 17-bit value from the corresponding data field bus (702-1 and 702-3). The result is a first 32-bit bus 710-0 that carries the combination daclass/destination port value, and a second 32-bit bus 710-1 that carries the combination saclass/source port value.

The combination values (daclass/destination port and saclass/source port) are applied to second level prefix engines (712-0 and 712-1). The second level prefix engines (712-0 and 712-1) perform the longest prefix matching operation required to generate the tuple equivalence values, such as those described in FIG. 5. Like the first level prefix engines (704-0 and 704-1), in the preferred embodiment 700, second level prefix engines (712-0 and 712-1) can be the longest prefix matching engines described in "LONGEST PREFIX MATCHING METHOD AND APPARATUS." In this arrangement, the first level prefix engines (704-0 and 704-1) provide a pipelined operation that generates daclass and saclass values on consecutive operational cycles. An operational (or system) cycle in such a case is usually dictated by the speed required to access a memory device, and is therefore typically equivalent to a memory clock cycle. The daclass and saclass values are combined with destination and source port values, and then applied to the second level prefix engines (712-0 and 712-1) to generate tuple equivalence class values (dtclass and stclass).

In this way, the possible ranges of pairs of field values can be "compressed" into tuple equivalence classes.

It is noted that the particular combining approach of FIG. 7 is used to generate an input value appropriate for the preferred longest prefix matching engines (712-0 and 712-1). If prefix matching engines were employed that required a different kind of input, appropriately altered combining circuits could be utilized. It is further noted that in the first embodiment 700, the destination port match criteria in each rule, while specifying a single port number in the particular example described above, could be a variable length prefix match. In such an event, the variable prefix for the combination value would include the daclass value and variable prefix of the destination port value. The above discussion of the combination daclass/destination port value is also applicable to the combination saclass/source port value. Namely, the combination value could be varied according to the match engine it is applied to, and the source port value can have a variable prefix length.

Referring once again to FIG. 7, in a similar fashion to the address equivalence and port values, the first embodiment 700 concatenates the dtclass and stclass values from second level prefix engines (712-0 and 712-1) within a second level combining circuit 714. The resulting combination dtclass/stclass values are provided on a 16-bit bus 716 to mapping circuit 718. The second level combining circuit 714 functions in conjunction with the mapping circuit 718 to determine output values in the manner set forth in FIGS. 6A and 6B. In particular, the second level combining circuit 714 merges the 8-bit bus carrying the dtclass value and the 8-bit bus carrying the stclass value into a 16-bit bus. The mapping circuit 718 stores output values corresponding to each possible dtclass/stclass combination value. Hence $2^{16}$ or 64K output values can be provided in this embodiment, since the combined stclass/dtclass value is 16 bits wide.

When a combination dtclass/stclass value is applied to mapping circuit 718 the corresponding output value is provided on output bus 720. In the particular arrangement of FIG. 7, the mapping circuit 718 is a 64K×n random access memory (RAM), where "n" is the number of bits in an output value. Of course, other memory devices, such as a content addressable memory (CAM) or the like, as just one example, could be used for the mapping circuit.

It is noted that the mapping 718 can serve to function as a last stage in a pipeline system. Accordingly, output values, like the address equivalence values and class equivalence values, can be provided on consecutive system cycles.

The particular embodiment of FIG. 7 illustrates a particular 97-bit multiple field lookup (i.e., 32-bit destination address+16-bit destination port+32-bit source address+16-bit destination port+1 bit protocol value). It will be recalled that the 17-bit source and destination port values of FIG. 7 include a 16-bit port identifier and a 1-bit protocol identifier (for either TCP or UDP). For some applications it may be desirable to have more matching fields. In particular, it may be desirable to include a protocol field to allow data processing according to more than two protocol types. While it could be possible to accommodate address matching fields by adding additional prefix engines, such an approach can have the drawback of additional chip area (for the case of a hardware implementation).

Second Embodiment

Figure 8:
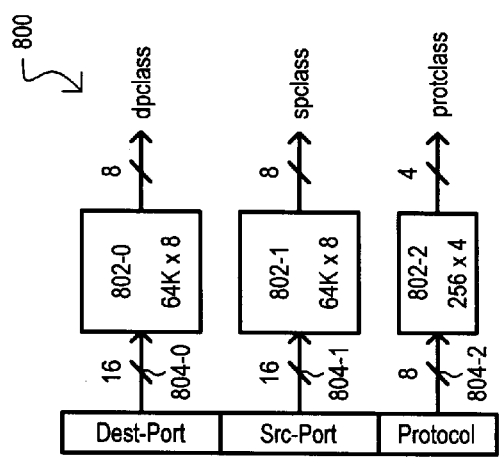
FIG. 8 is a block schematic diagram illustrating a second embodiment architecture.

An example of a second embodiment which adds an additional 8-bit protocol field to the multiple field matching system is set forth in FIG. 8. The approach of FIG. 8 incorporates the concept of port equivalence classes, similar to the address equivalence and tuple equivalence classes discussed previously. Port equivalence classes are generated by noting which sets of port values (both destination and source) may be treated as equivalent with respect to all the rules in the table. In addition, the second embodiment classifies protocol values into protocol equivalence classes by noting which protocol values may be treated as equivalent with respect to all rules in the table.

The second embodiment is designated by the general reference character 800 and is shown to receive a 16-bit destination port field value, a 16-bit source port field value, and an 8-bit protocol field value. The second embodiment 800 includes a number of "field classifiers," shown as items 802-0, 802-1, and 802-2.

Field classifier 802-0 receives the destination port value on a first data field bus 804-0, and in response thereto, it provides a destination port equivalence class value (dpclass). It is noted that the in the particular example of FIG. 8, it is assumed that for the various 16-bit destination port values no more than 256 destination port equivalence classes will result. Accordingly, field classifier 802-0 can be a 64K×8 RAM. Of course, the particular RAM arrangement could be increased or decreased in the event greater or lesser numbers of dpclass values are required.

In the same general fashion as field classifier 802-0, field classifier 802-1 receives the 16-bit source port value on a second data field bus 804-1 and generates one of 256 source port equivalence class (spclass) values. Accordingly, field classifier 802-1 can also be a 64K×8 RAM.

Field classifier 802-2 receives the 8-bit protocol value on third data field bus 804-2, and in response thereto, provides a corresponding protocol equivalence class (protclass)

value. In the particular arrangement of FIG. 8, it is assumed that the 256 possible protocol values will require no more than 16 protclass values. Accordingly, field classifier 802-2 can be a 256×4 RAM. Of course, as noted above, smaller or larger RAMs could be utilized if fewer or smaller protclass values are necessary.

In this manner, input data field values having particular bit widths (16, 16, 8) can be replaced by equivalence values having a smaller number of bits (8, 8, 4). That is, the various ranges of input data fields can be compressed into equivalence class values.

The dpclass, spclass, and portclass can then be used in place of the first field (Dest-Port) and third field (Src-Port) values in the architecture of FIG. 7 to accomplish the (now) five field matching operation. In particular, the 8-bit dpclass value can be combined with the corresponding 4-bit protclass value to generate a 12-bit protclass+dpclass combination value. This value could be substituted for the 17-bit second field (Dest-Port) value received by second data field bus 702-1. Accordingly, only a 12-bit bus is required instead of the 17-bit bus of FIG. 7.

In the same general fashion, the 8-bit spclass value can be combined with the corresponding 4-bit protclass value to generate a 12-bit protclass+spclass combination value. This value could be substituted for the 17-bit fourth field (Src-Port) value received by fourth data field bus 702-3. Again, the result can be a 12-bit bus is the place of the 17-bit bus of FIG. 7.

In the particular arrangement of FIG. 8, the resulting port equivalence class values (dpclass and spclass) apply to all protocols. This aspect may best be understood by example. Four combinations of destination port and protocols are set forth below.

Combination 1: Dest-Port=1000; Protocol=UDP→Flowspec *C*

Combination 2: Dest-Port=1001; Protocol=UDP→Flowspec *C*

Combination 3: Dest-Port=1000; Protocol=TCP→Flowspec *C*

Combination 4: Dest-Port=1001; Protocol=TCP→Flowspec *D*

The first two combinations of ports and protocols is intended to indicate that variations between the port numbers 1000 and 1001 for a UDP protocol do not result in differences in a search result. In contrast, variations between the two port values for a TCP protocol can correspond to different output values.

The above examples show how despite the fact that the 1000/UDP and 1001/UDP combinations correspond to the same output result (flowspec C), the destination port values of 1000 and 1001 must result in different class equivalence values (dpclass). That is, two destination port values are only in the same equivalence class if they are equivalent for all protocols; here the values 1000 and 1001 are not equivalent for TCP, which means they are not in the same equivalence class.

Third Embodiment

In the event a given set of classification rules results in too many non-overlapping classes for port/protocol combinations, the various field values (Dest-Port, Src-Port, Protocol) can be processed to generate protocol/port equivalence values. Such an approach is set forth as a third embodiment in FIG. 9.

The third embodiment is designated by the general reference character 900 and, like the second embodiment 800, is shown to receive a 16-bit destination port value (Dest-Port), a 16-bit source port value (Src-Port), and an 8-bit protocol value (Protocol). The third embodiment 900 includes a number of first level field classifiers, shown as items 902-0, 902-1, and 902-2.

First level field classifier 902-0 operates in a similar fashion to field classifier 802-0, receiving the destination port value on a first data field bus 904-0, in response thereto, providing a destination port equivalence class value (dpclass). Unlike field classifier 802-0, first level field classifier 902-0 provides a 12-bit output, allowing for a greater number of dpclass values. That is, first level field classifiers 902-0 and 902-1 can provide less compression than 802-0 and 802-1. The dpclass values are shown to be output on a 12-bit first port class bus 906-0. The first level field classifier 902-0 of the third embodiment 900 is shown to be a 64K×16 RAM.

In the same general fashion as first level field classifier 902-0, first level field classifier 902-1 receives 16-bit source port values on a second data field bus 904-1 and generates source port equivalence class (spclass) values. In the particular arrangement of FIG. 9, first level field classifier provides a 12-bit output on a second port class bus 906-1, allowing for a greater number of spclass values than the field classifier 802-1. Accordingly, field classifier 902-1 can also be a 64K×16 RAM.

Figure 9:
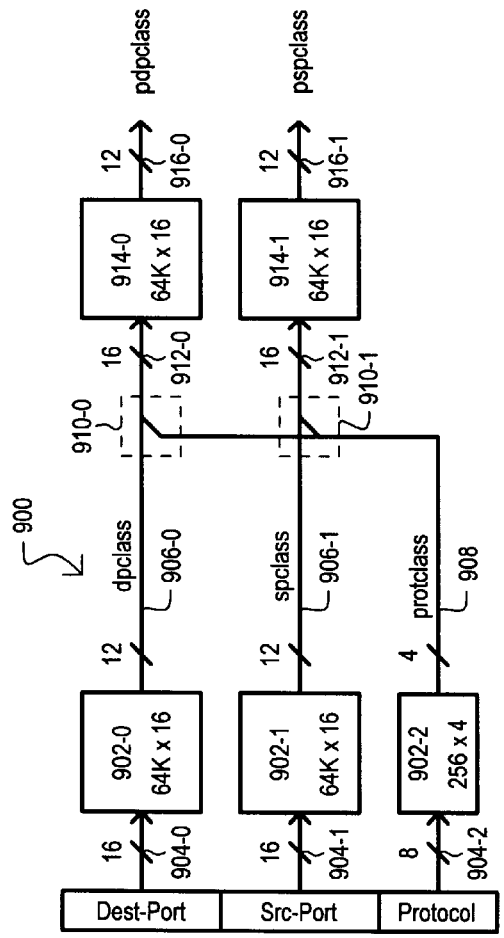
FIG. 9 is a block schematic diagram illustrating a third embodiment architecture.

First level field classifier 902-2 functions in the same fashion as field classifier 802-2 of FIG. 8, receiving the 8-bit protocol value on a third data field bus 904-2, and in response thereto, providing a 4-bit protocol equivalence class (protclass) value. Thus, first level field classifier 902-2 can be a 256×4 RAM. As shown in FIG. 9, the protclass value is output onto a protocol class bus 908.

Processing of data field values continues in the third embodiment 900 with port equivalence values being concatenated with protocol equivalence values to generate particular port/protocol equivalence values. This function is accomplished in the particular embodiment of FIG. 9 by combining circuits 910-0 and 910-1.

As shown in FIG. 9, combining circuit 910-0 generates a combination value by concatenating the 12-bit first port class bus 906-0 with the four bit protocol class bus 908. The result is a 16-bit destination port/protocol bus 912-0. Similarly, combining circuit 910-1 generates a combination value by concatenating the 12-bit second port class bus 906-0 with the four bit protocol class bus 908. The result is a 16-bit source port/protocol bus 912-1.

Port/protocol equivalence classes are then generated by providing corresponding port/protocol tuple equivalence values for selected port/protocol combination values. The port/protocol tuple equivalence values will correspond to port/protocol combinations that may be treated as equivalent with respect to all other rules in the table. This function is accomplished by second level field classifiers 914-0 and 914-1.

Second level field classifier 914-0 receives a 16-bit value on the dpclass/protclass bus 912-0, and in response thereto, provides a protocol+destination port tuple equivalence class (pdpclass) value. The pdpclass value is a 12 bit value that is output on a first port/protocol class bus 916-0. The second field classifier 914-0 can be a 64K×16 RAM.

In a similar fashion to second level field classifier 914-0, second level field classifier 914-1 receives a 16-bit value on the spclass/protclass bus 912-1, and in response thereto, provides a protocol+source port equivalence class (pspclass) value. The pspclass value is a 12-bit value that is output on a second port/protocol class bus 916-1. Like second level field classifier 914-0, second level field classifier 914-1 can also be a 64K×16 RAM.

If reference is made to FIG. 7 in combination with FIG. 9, it is noted that pdpclass and pspclass values can be used in place of the first and third field values (Dest-Port and Src-Port) in the architecture of FIG. 7. In this way, a five field matching operation can be accomplished. In particular, the 12-bit pdpclass value can be substituted for the 17-bit Dest-Port value received by second data field bus 702-1. Accordingly, only a 12-bit bus is required instead of the 17-bit bus of FIG. 7. In the same general fashion, the 12-bit pspclass value can be substituted for the 17-bit Src-Port value received by fourth data field bus 702-3. Again, the result can be a 12-bit bus in the place of the 17-bit bus of FIG. 7.

It is noted that both second and third embodiments (800 and 900), by utilizing RAM devices as the field classifiers (802-0 to 802-2, 902-0 to 902-2, and 914-0 and 914-1), can maintain a pipelined operation. That is, the field classifiers (802-0 to 802-2) can provide dpclass, spclass and protclass values on consecutive system cycles. Similarly, first level field classifiers (902-0 to 902-2) and second level field classifiers (914-0 and 914-1) can provide their respective output values on consecutive system cycles. Accordingly, when the arrangements of FIGS. 8 and 9 are applied to the architecture of FIG. 7 as described, one output per system cycle can be maintained.

While the fully pipelined processing capability of the first, second, and third embodiments (700, 800 and 900) provides for high throughput multiple field match capabilities, such high throughput may not always be required. In addition, while the architecture for the first, second, and third embodiments envisions utilizing four longest prefix matching engines, a more compact structure may be desirable. To address such additional system concerns, embodiments having lower processing throughput but more compact structures are possible. One such embodiment is a fourth embodiment set forth in FIG. 10, and designated by the general reference character 1000.

Fourth Embodiment

Like the first embodiment 700 of FIG. 7, the fourth embodiment 1000 receives four data fields in parallel. In particular, the data fields include a 32-bit IP destination address (Dest-IP) that is received on a first data field bus 1002-0, a 17-bit destination port value (Dest-Port) that is received on a second data field bus 1002-1, a 32-bit IP source address (Src-IP) that is received on a third data field bus 1002-2, and a 17-bit source port value (Src-Port) that is received on a fourth data field bus 1002-3.

Unlike the previous embodiments (700, 800, 900), the fourth embodiment 1000 includes input multiplexers (MUXs) (1004-0 and 1004-1) that pass one set of data field value on one system cycle, and another set of the data fields on a subsequent system cycle. In particular, the input MUX 1004-0 receives the Dest-IP values as one input, and the Src-IP values as another input. The Src-IP values are received by way of first delay circuit 1006-0. In this manner, on one system clock cycle, the Dest-IP value can be output on first MUX output bus 1008-0, while on a subsequent clock cycle, due to the operation of first delay circuit 1006-0, the Src-IP value can be output on first MUX output bus 1008-0. A controlling state machine, not shown in the diagram, toggles the MUX select for 1004-0 each clock cycle. Similarly, input MUX 1004-1 receives the Dest-Port values as one input and the Src-Port values as another input. Like the Src-IP values, the Src-Port values are received by way of a second delay circuit 1006-1. Thus, on one system clock cycle, the Dest-Port value can be output on second MUX output bus 1008-1 (at the same time the Dest-IP value is output on bus 1008-0), while on a subsequent clock cycle, due to the operation of second delay circuit 1006-1, the Src-Port value can be output on second MUX output bus 1008-1 (at the same time the Src-IP value is output on bus 1008-0).

The particular fourth embodiment 1000 can provide multiple field match results in a similar fashion as the first embodiment 700. First field values (Dest-IP) and third field values (Src-IP) can be compressed into equivalence classes (daclass and saclass). Two examples of the generation of such daclass and saclass values are set forth in FIGS. 4A and 4B.

Unlike the other previously described embodiments (700, 800 and 900), in embodiment 1000 the equivalence values daclass and saclass are generated on alternating clock cycles. This behavior arises out of the arrangement of FIG. 10, in which a single first level prefix engine 1010 is used to map both Dest-IP to daclass and Src-IP to saclass values. In particular, the first level prefix engine 1010 receives Dest-IP and Src-IP values on the first MUX output bus 1008-0 on alternating clock cycles. The first level matching engine 1010 will perform a longest prefix matching function on the applied first or third fields to generate the appropriate equivalence class values daclass or saclass, respectively.

In the fourth embodiment 1000, like the previous embodiments (700, 800 and 900), the first level matching engine can be the longest prefix matching engines described "LONGEST PREFIX MATCHING METHOD AND APPARATUS," and so take advantage of the rapid processing speeds described therein. Alternate matching engines, employing different search algorithms or circuit technology such as content-addressable memory (CAM), could also be employed.

The fourth embodiment 1000 further includes a delay circuit 1012 that delays a second (Dest-Port) or fourth (Src-Port) field value by the amount of time it takes the first prefix matching engine 1010 to generate an equivalence class value (daclass or saclass). In particular, when a second field (Dest-Port) value is received on second MUX output bus 1008-1, it is delayed, and then output from delay circuit 1012 on the same clock edge that a corresponding first field equivalence class value (daclass) is output from the first level prefix engine 1010. On the next cycle, a fourth field value (Src-Port) is delayed within delay circuit 1012, and then output at the same general time that the corresponding third field equivalence class value (saclass) is output from the first level prefix engine 1010.

Referring yet again to FIG. 10, the output of the first level prefix engine 1010 and the delay circuit 1012 are concatenated by a combining circuit 1014. In particular, on a given clock cycle, the daclass value will be concatenated with its corresponding destination port value to generate combination daclass/destination port values on a second level input bus 1016. On a subsequent clock cycle the saclass value will be concatenated with its corresponding source port value to generate a combination saclass/source port value on second level input bus 1016.

The alternately arriving concatenated values (daclass/destination port and saclass/source port) on the second level input bus 1016 are applied to a second level prefix engine 1018. The second level prefix engine 1018 performs a longest prefix matching operation required to provide precomputed tuple class equivalence values, such as those described in FIG. 5.

Like the first level prefix engine 1010 of FIG. 10, the second level prefix engine 1018 can be the longest prefix matching engines described "LONGEST PREFIX MATCHING METHOD AND APPARATUS." In this arrangement, in a similar fashion to the first embodiment 700, the first level prefix engine 1010 provides a pipelined operation that generates equivalence class values (daclass and saclass) on alternate consecutive operational cycles. The equivalence class values (daclass and saclass) are combined with destination and source port values, and then applied to the second level prefix engine 1018 on alternate consecutive operational cycles to generate tuple equivalence class values (dtclass and stclass) values.

In particular, the second level prefix engine 1018 will provide a dtclass value on one system cycle, and a stclass value on a subsequent system cycles on the same 8-bit bus 1020. As shown in FIG. 10, the 8-bit bus 1020 drives both a direct 8-bit bus 1022 and an 8-bit latch input bus 1024. The latch input bus 1024 applies an 8-bit value to latch 1026. Latch 1026 will latch an input value on one system cycle and then output the value on the subsequent cycle. The output of the latch 1026 is an 8-bit latch output bus 1028. The values provided by the latch output bus 1028 are then combined with values on the direct 8-bit bus 1022 within an output combining circuit 1030.

In the particular arrangement of FIG. 10, the output combining circuit 1030 combines the direct 8-bit bus 1022 with the 8-bit latch output bus 1028 to create a 16-bit map input bus 1032. In this arrangement on a first clock cycle, a dtclass value will be output from the second level match engine 1018 and stored within latch 1026. On a subsequent clock cycle, a stclass value will be output from the second level match engine and placed on the 8-bit direct bus 1022. At the same time, the previously latched dtclass value will be output from the latch 1026 on the latch output bus 1028. The result is a combination dtclass/stclass value on the map input bus 1032 that is applied to mapping circuit 1034.

Like the mapping circuit 718 of the first embodiment 700, the mapping circuit 1034 will include an output value corresponding to each tuple equivalence class value (dtclass/stclass). When a combination dtclass/stclass value is applied to mapping circuit 1034 a corresponding output value is provided on output bus 1036. In the particular arrangement of FIG. 10, the mapping circuit 1034 is 64K×n RAM, where "n" is the number of bits in the output values. Unlike the previous embodiments (700, 800 and 900), the mapping circuit 1034, because it receives combination dtclass/stclass value every two cycles, will provide corresponding output values every two cycles.

The various embodiments described above have utilized 8-bit dtclass values and 8-bit stclass values. Wider dtclass and stclass values can be utilized by increasing the size of the mapping circuit (718 or 1034). As just one example, a 512K×n RAM could be used, allowing for twice the number of dtclass and stclass values.

It is also noted that the preferred longest prefix matching engine used as the second level prefix engines (712-0, 712-1 and 1018) are capable of providing 15-bit output values, but only provide 8-bit output values. The unused 7-bits could provide information particular to dtclass or stclass values.

While the various embodiments set forth examples in which the tuple equivalence class values (dtclass and stclass) are both 8-bit values, such an arrangement should not be construed as limiting to the invention. In particular, the dtclass value could have more or fewer bits than the corresponding stclass value, and vice versa. In such an arrangement, the dtclass output value could include information indicating which bits of the output value should be used as index information for the mapping circuit. Such a data format is set forth in FIG. 11. As shown in FIG. 11, the output value includes an eleven bit field (DTCLASS) for providing a first tuple equivalence class value (dtclass), and a three bit field (BITCNT-5) that indicates valid DTCLASS bit widths from 5 to 12 bits. The second tuple equivalence class value (stclass) could have similar structure. In such a case, the second level combining circuits (714 or 1030) would have additional logic to ensure that no address collision occurs.

Figure 12:
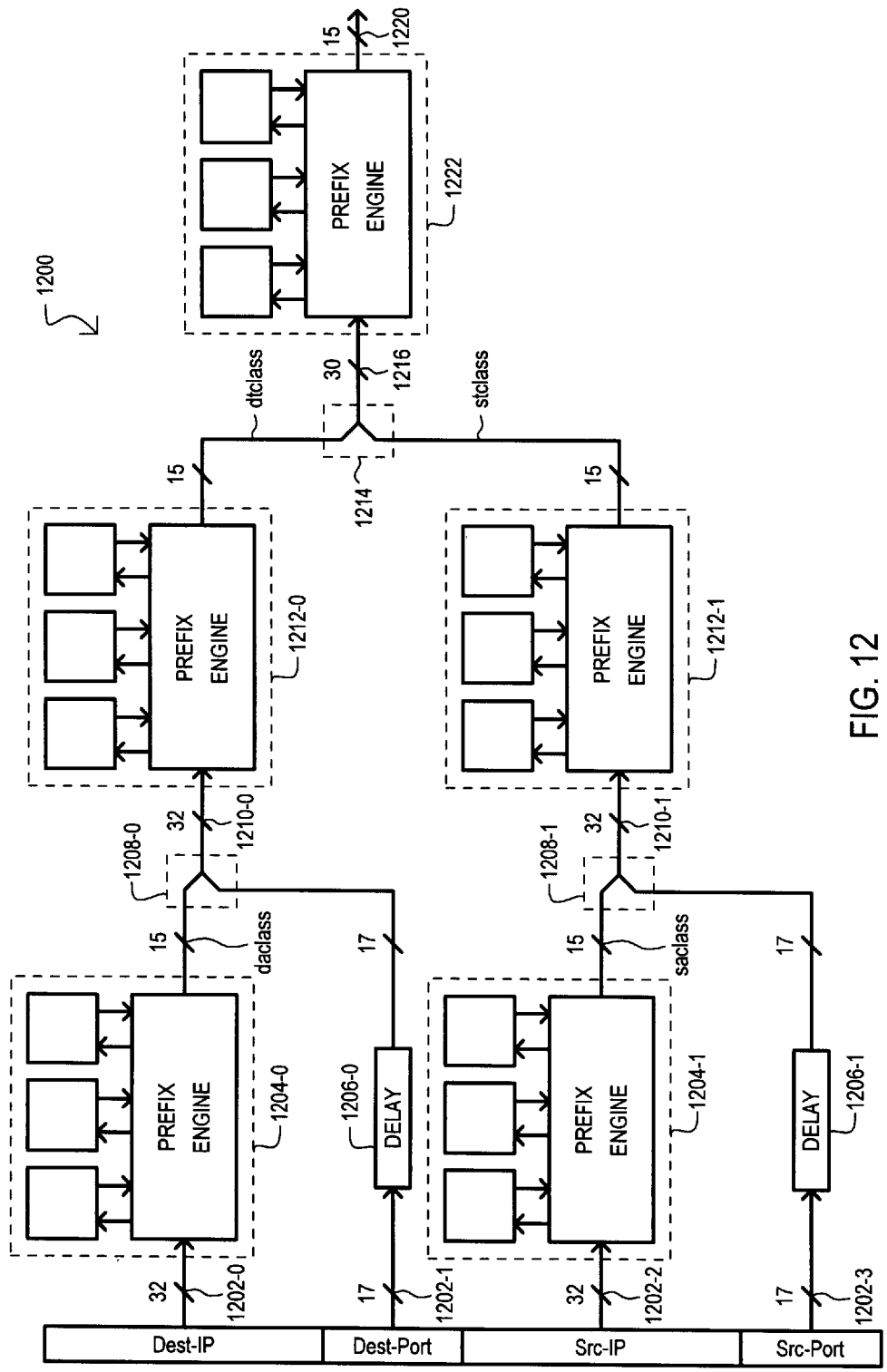
FIG. 12 is a block schematic diagram illustrating a fifth embodiment architecture.

Yet another solution to increasing the number of available tuple equivalence class values (dtclass and stclass) is set forth as a fifth embodiment in FIG. 12.

Fifth Embodiment

The fifth embodiment is designated by the general reference character 1200 and includes many of the same constituents as the first embodiment 700. To that extent, like constituents will be referred to by the same reference character but with the initial digit being a "12" instead of a "7."

The fifth embodiment 1200 differs from the previously described embodiments (700, 800, 900 and 1000) in that the second level prefix engines (1202-0 and 1202-1) provide tuple equivalence values (dtclass and stclass) that are 15-bits long. This allows for 32 k different tuple equivalence class values (dtclass and stclass).

The fifth embodiment 1200 farther differs from the previously described embodiments (700, 800, 900 and 1000) in that while the tuple equivalence class values (dtclass and stclass) are combined within a second level combining circuit 1214, the resulting 30-bit combination dtclass/stclass value is not processed by a direct index mapping circuit. Instead, a third level prefix engine 1222 is provided that includes a number of matching rules to provide an output value that corresponds to the appropriate combination dtclass/stclass values. The preferred third level prefix engine 1222 can be the longest prefix matching engines described in "LONGEST PREFIX MATCHING METHOD AND APPARATUS." In this arrangement, pipelined operation is maintained, with one output value being provided on each system cycle. However, the additional processing stage will increase overall latency of the system (time between header information input and flowspec output).

One skilled in the art would recognize that the various embodiments set forth herein can be subject to the same variations and optimizations set forth in "LONGEST PREFIX MATCHING METHOD AND APPARATUS." Such variations and optimizations include, without limitation, the use of "code dictionaries," rapid data structure update algorithms, and alternate "software" embodiments described therein.

The high throughput processing capabilities of the preferred embodiments prefix engines can result in a complex QOS or packet accounting rule table to be searched at speeds of 100 Mpps and higher.

It is understood that while the embodiments set forth herein have illustrated hardware optimized approaches, the general architecture is suitable for implementation in software as well. Accordingly, while the various embodiments set forth herein have been described in detail, it is to be understood that the present invention could be subject various changes, substitutions, and alterations without departing from the spirit and scope of the invention. Accordingly, the present invention is intended to be limited only as defined by the appended claims.

What is claimed is:

1. A system that provides output values when an input search key value matches a multiple field rule, the system comprising:

a first prefix engine that receives at least a first search key field, the first prefix engine translating values of the first search key field into first field equivalence class numbers by prefix matching, a first equivalence class number representing a stored subset S of a range of the first search key field such that, regardless of values of search keys applied for other fields, any member of the subset S may be substituted for any other member of the subset S, without changing a result returned by a search;

a first combining circuit that combines the first field equivalence class numbers with third field values to form first combination values; and a first cross-product prefix engine that receives the first combination values and translates the first combination values into first tuple equivalence class numbers by prefix matching, a tuple equivalence class number representing a previously computed and stored subset T of the cross-product of the ranges of at least two search key fields such that, regardless of the values of search keys applied for other fields, any member of the subset T may be substituted for any other member of the subset T, without changing a result returned by the search.

2. The system of claim 1, further including: a second prefix engine that receives at least a second field from the search key value, the second prefix engine translating values of the second field into second field equivalence class numbers.

3. The system of claim 2, further including: a mapping circuit that provides output values in response to combinations of the first field equivalence numbers and the second field equivalence numbers.

4. The system of claim 2, further including:

a second combining circuit that combines the second field equivalence class numbers with fourth field values to form second combination values; and a second cross-product prefix engine that receives the second combination values and translates the second combination values into second tuple equivalence class numbers by prefix matching.

5. The system of claim 4, further including:

a mapping circuit that provides output values in response to the first tuple equivalence class numbers and the second tuple equivalence class numbers.

6. A system for generating output values in response to multiple field match criteria, the system comprising:

a first single-field prefix engine that receives first data field values and provides first class values, each first class value corresponding to a predetermined subset of possible first data field values;

a first combining circuit that combines the first class values with second data field values and provides first combination values;

a first cross-product prefix engine that provides second class values in response to the first combination values, each of the second class values corresponding to a predetermined subset of possible first combination values, and an output circuit that receives the second class values and provides corresponding output values that indicate a multiple field match with a key value having at least a first data field and a second data field.

7. The system of claim 6, wherein:

the first single-field prefix engine provides the first class values according to longest prefix matching.

8. The system of claim 6, wherein:

the first cross-product prefix engine provides the second class values according to longest prefix matching.

9. The system of claim 6, wherein:

the output circuit includes a random access memory.

10. The system of claim 6, wherein:

the output circuit includes an output prefix engine that generates output values in response to a predetermined subset of possible second class values.

11. The system of claim 6, further including:

the first single-field prefix engine provides a first class value a first processing delay period after receiving a first data field value; and a first delay circuit disposed between a second data field bus and the first combining circuit, the first delay circuit delaying the second data field values from the second data field bus by approximately the first processing delay period.

12. A system that provides multiple field matching of input key values, comprising:

a plurality of data field inputs;

a prefix engine coupled to at least one of the data field inputs, the prefix engine compressing ranges of field values of the at least one of the data field inputs into equivalence class values according to prefix matching operations, the prefix engine being a first single-field prefix engine coupled to a first data field input that provides first equivalence class values;

a first combining circuit that combines the first equivalence class values with third field values and provides first field combination values; and a first cross-product prefix engine coupled to the first combining circuit, the first cross-product prefix engine compressing the first field combination values into first tuple equivalence class values according to prefix matching operations, the first tuple equivalence class values representing a previously computed and stored subset T of the cross-product of the ranges of at least two input key values such that, regardless of input key values applied for other fields, any member of the subset T may be substituted for any other member of the subset T, without changing a result returned by a search.

13. The system of claim 12 further comprising:

a mapping circuit that stores output values accessed in response to particular equivalence class values.

14. The system of claim 13, wherein:

the prefix engine is coupled to the plurality of data field inputs, the prefix engine compressing ranges of multiple field values into corresponding equivalence class values according to prefix matching operations.

15. The system of claim 13, further comprising:

a second single-field prefix engine coupled to a second data field input that provides second equivalence class values.

16. The system of claim 15, further including:

a second combining circuit that combines the second equivalence class values with fourth field values and provides second field combination values;

a second cross-product prefix engine coupled to the second combining circuit, the second cross-product prefix engine compressing the second field combination values into second tuple equivalence class values according to prefix matching operations; and the mapping circuit accesses particular output values in response to the first and the second tuple equivalence class values.

17. The system of claim 12, wherein:

at least one of the data field inputs receives a network address value.

* * * * *